United States Patent [19]

Rowe et al.

[11] Patent Number: 4,808,873
[45] Date of Patent: Feb. 28, 1989

[54] SUPPORT ARRANGEMENT INCLUDING SPACER ELEMENTS FOR DIAMOND AREA OF DYNAMOELECTRIC MACHINE

[75] Inventors: Charles M. Rowe, Orlando; Henry M. Holly, III, Winter Park, both of Fla.

[73] Assignee: Westinghouse Electric Corp., Pittsburgh, Pa.

[21] Appl. No.: 91,223

[22] Filed: Aug. 31, 1987

[51] Int. Cl.⁴ .............................................. H02K 3/46
[52] U.S. Cl. .................................... 310/260; 310/43; 310/45; 310/64; 310/270
[58] Field of Search ................... 310/42, 64, 43, 65, 310/91, 260, 270, 254, 181, 208; 336/196, 197, 198

[56] References Cited

U.S. PATENT DOCUMENTS

| | | |
|---|---|---|
| 3,942,057 | 3/1976 | Philofsky ........................... 310/260 |
| 3,949,256 | 4/1976 | Cooper et al. . |
| 3,949,257 | 4/1976 | Cooper et al. . |
| 4,379,243 | 12/1984 | Dailey et al. . |
| 4,488,079 | 12/1984 | Dailey et al. . |
| 4,563,607 | 1/1986 | Cooper et al. . |

FOREIGN PATENT DOCUMENTS

| | | |
|---|---|---|
| 1788142 | 5/1973 | Fed. Rep. of Germany ........ 310/43 |
| 2231292 | 1/1974 | Fed. Rep. of Germany ...... 310/260 |
| 2150163 | 9/1979 | Fed. Rep. of Germany ...... 310/270 |
| 1343992 | 8/1963 | France ................................ 310/260 |
| 0347571 | 8/1960 | Switzerland ......................... 310/43 |
| 1021407 | 3/1966 | United Kingdom ............... 310/260 |

*Primary Examiner*—R. Skudy
*Attorney, Agent, or Firm*—D. C. Abeles

[57] ABSTRACT

A filler material for supporting the coil end portions at the diamond area of a dynamoelectric machine consists of a resin filler disposed in the vent areas between adjacent coil end portions and a plurality of spacer blocks disposed in the filler. The spacer blocks have a sufficient volume and coefficient of thermal expansion to prevent excessive build up of temperature during curing of the resin and to decrease the overall coefficient of thermal expansion of the filler material and adjust the thermal expansion characteristics of the filler material so that such characteristics more closely match the thermal expansion characteristics of the coils themselves. The resin filler comprises an epoxy resin and the blocks, which have a generally orthogonal shape, are constructed of a laminated fiber glass material. A bead of resinous material is provided at the edges of the planar surfaces of the orthogonally shaped blocks to prevent abrasive contact between the blocks and the adjacent coil end portions.

19 Claims, 3 Drawing Sheets

SUPPORT ARRANGEMENT INCLUDING SPACER ELEMENTS FOR DIAMOND AREA OF DYNAMOELECTRIC MACHINE

BACKGROUND OF THE INVENTION

1. Field of the Invention

This invention relates to end turn support arrangements for dynamoelectric machines.

2. Description of the Prior Art

In the dynamoelectric machine art there continues to be a need for improving the support arrangement for the end turn portions of the winding coils extending from the ends of the stators of dynamoelectric machines such as large turbine generators. Manifestly, the stresses imposed during operation, particularly those caused by vibration, result in wear of coil insulation and fatigue cracking of series and copper strand phase connections. Many proposals have been made in the past in an effort to solve this long standing problem and examples of prior art arragements are illustrated in U.S. Pat. Nos. 3,949,256; 3,949,257; 4,379,243; and 4,488,079, the entireties of the disclosures of which are hereby specifically incorporated herein by reference. Other proposals have included packing the entire end turn area with a thixotropic, curable potting resin such as an epoxy, a polyester or a polyurethane material.

Among the problems encountered through the use of resin fillers is that fillers, and in particular the epoxies, which have the best mechanical properties generally have a coefficient of thermal expansion which appears to be approximately 4 times as great as the apparent coefficient of thermal expansion of the end turns themselves. Although such coefficients are difficult to calculate with any mathematical exactitude, the general result of a significant mismatch between the coefficients of the filler material and of the end turn windings often is a debonding of the resin filler from the windings.

Another problem encountered when using potting resin type materials is that the curing reaction is generally highly exothermic, and when the volume of the curing material is too great, hot spots sufficient to actually destroy the resin may develop internallly.

The present invention is aimed at the provision of novel support arrangements including filler materials which solve the problems encountered in using prior art resin fillers.

SUMMARY OF THE INVENTION

To eleviate the prior art problems discussed above, the present invention provides an arrangment for providing support fo the coil end portions at the diamond area of a dynamoelectric machine equipped with a stator having top and bottom winding coil end portions extending outwardly from the stator at each end thereof. The arrangement comprises the use of a filler material including a resin filler disposed in the vent areas between adjacent coil end portions, and a plurality of spacer blocks disposed within the resin filler and having a sufficient volume and coefficient of expansion to prevent excessive build up of temperature during curing of the resin and decrease the overall coefficient of thermal expansion of the filler material to a level such that the filler material does not react independently of the end coils during temperature fluxuations. In this regard, the blocks adjust the thermal expansion characteristics of the overall filler material so that such characteristics more closely match the thermal expansion characteristics of the coils themselves, and as a result, debonding during operation is inhibited. Generally speaking the spacer blocks should occupy up to about 50% of the total volume containing the resin filler material, and preferably, the spacer blocks should occupy approximately 30% of the filled volume.

In accordance with the invention, the resin filler is preferably an epoxy resin and the spacer blocks are preferably constructed of a laminated fiberglass material. The blocks may preferably be provided with means thereon for preventing abrasive contact between the blocks and the coils. Such means for preventing abrasive contact may comprise a resilient bead of a resin material disposed on the corners of the spacer blocks which preferably should be orthogonal in shape.

BRIEF DESCRIPTION OF THE DRAWINGS

FIG. 4 is a isometric view of a spacer block used in connection with the present invention.

DESCRIPTION OF THE PREFERRED EMBODIMENTS

Figure 1:
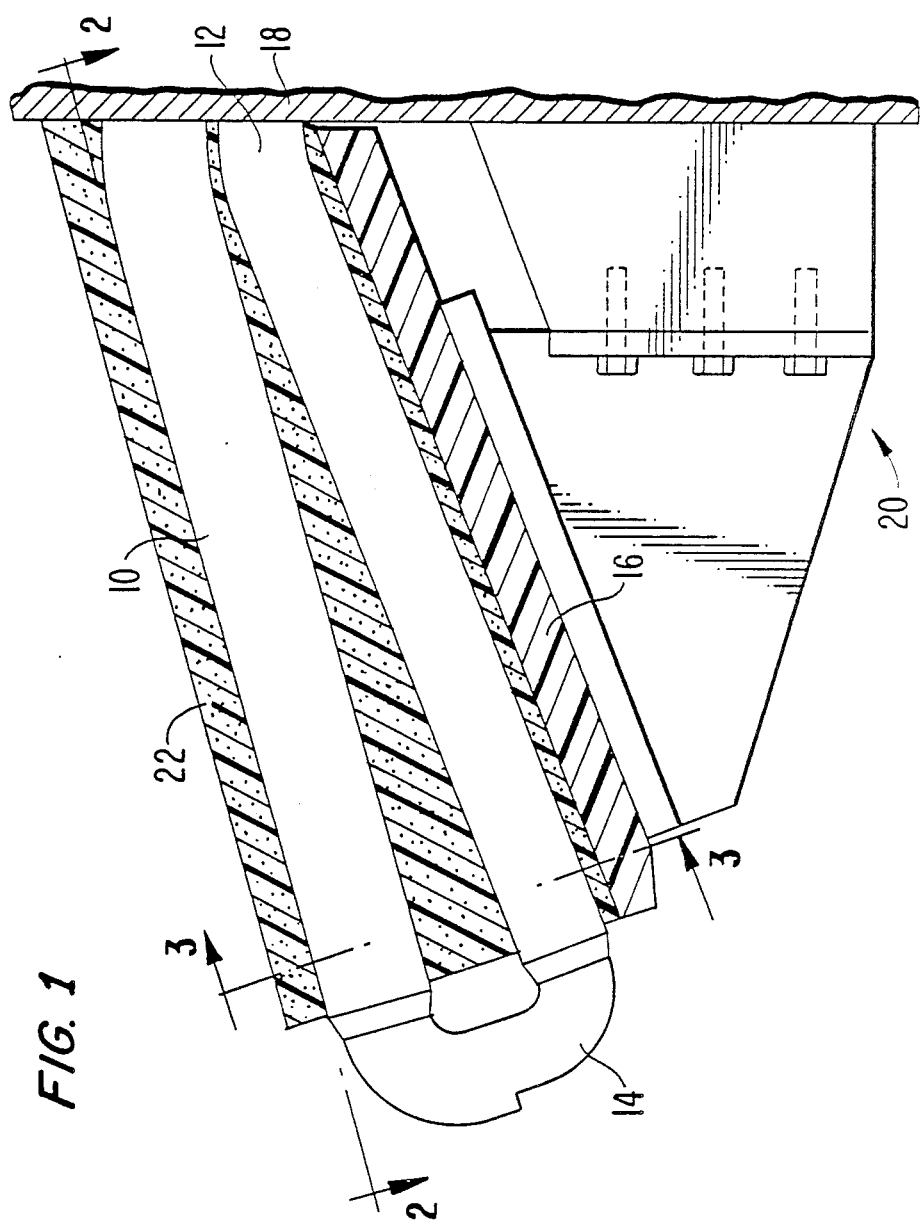
FIG. 1 is a side elevational view of a stator coil end turn assembly of a dynamoelectric machine which incorporates a support arrangement in accordance with the concepts and principles of the present invention.

The winding coil end portions of a stator for a dynamoelectric machine, in this case a large turbine generator, are illustrated in FIG. 1 where a top coil end portion is identified by the reference numeral 10, a bottom coil end portion as identified by the reference numeral 12 and a series connection for interconnecting a top coil end portion 10 and a bottom coil end portion 12 is identified by reference numeral 14. Top coil end portion 10 and bottom coil end portion 12 extend outwardly from the end of the stator 18, only a small portion of which is shown.

It will be understood by those skilled in the dynamoelectric machine art that a certain amount of artistic license has been exercised in the drawings consistent with common practice in showing end turn support arrangements. The end turns actually are curved into and out of a plane through the axis of the machine rather than directly axially extending as implied by FIG. 1. The top and bottom coil end portions normally curve in opposite directions and are joined respectively, to another bottom coil end portion and another top coil end portion from different slots in the stator. The relative curving of the top and bottom coil end portions 10 and 12 is illustrated schematically in FIG. 2 which shows only a portion of the end turn area that extends annularly all the way around the machine.

Figure 2:
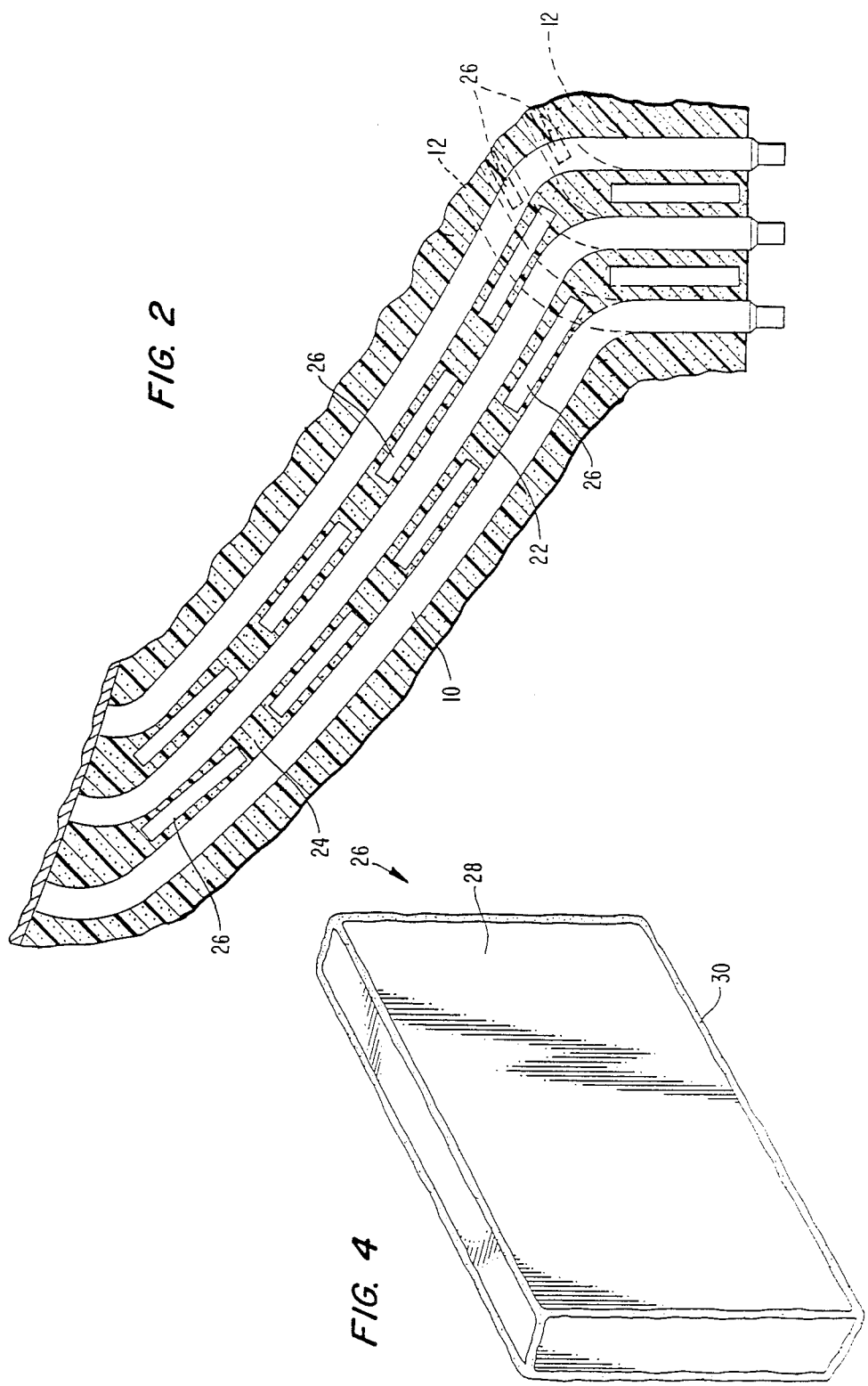
FIG. 2 is a partial cross-sectional view taken essentially along the line 2—2 of FIG. 1 to schematically illustrate the diamond area of the machine.

Viewing FIG. 2 it can be seen that the top coil portions 10 are elongated and arranged in a generally parallel, laterally spaced relationship so as to present respective elongated curved vent areas 24 between adjacent coil end portions 10. The disposition and arrangement of the bottom coil portions 12 is similar, except the curvature thereof is in the opposite direction.

As is well known to those working in the dynamoelectric machine field, stator 18, and the end portions of the coils which are conventionally referred to as the diamond area, are annular and define a bore for the rotor. In the dynamoelectric machine art, the coils which are closest to the center of rotation of the rotor are generally referred to as to coils while the coils which are furtherest from the center of rotation of the rotor are generally referred to as bottom coils. Thus, FIG. 1 is a cross-sectional elevation view taken essentially at the lower end of the end turn or diamond area of the machine.

A conical member 16 is disposed in surrounding relationship relative to bottom coil end portions 12. Member 16 is preferably constructed of a fiber glass material and the same may be of a construction as described in said U.S. Pat. No. 4,379,243 and No. 4,488,079 patents. The conical member 16, as shown in FIG. 1, is located radially outside the end turns and provides a support structure that preferably has appropriate thermal expansion characteristics so that it expands in a manner which is similar to the expansion of the coil end turns that it supports. Conventional mounting structure designated broadly by the reference numeral 20 may be provided for mounting the conical member 16 on the end of the stator structure 18.

Figure 3:
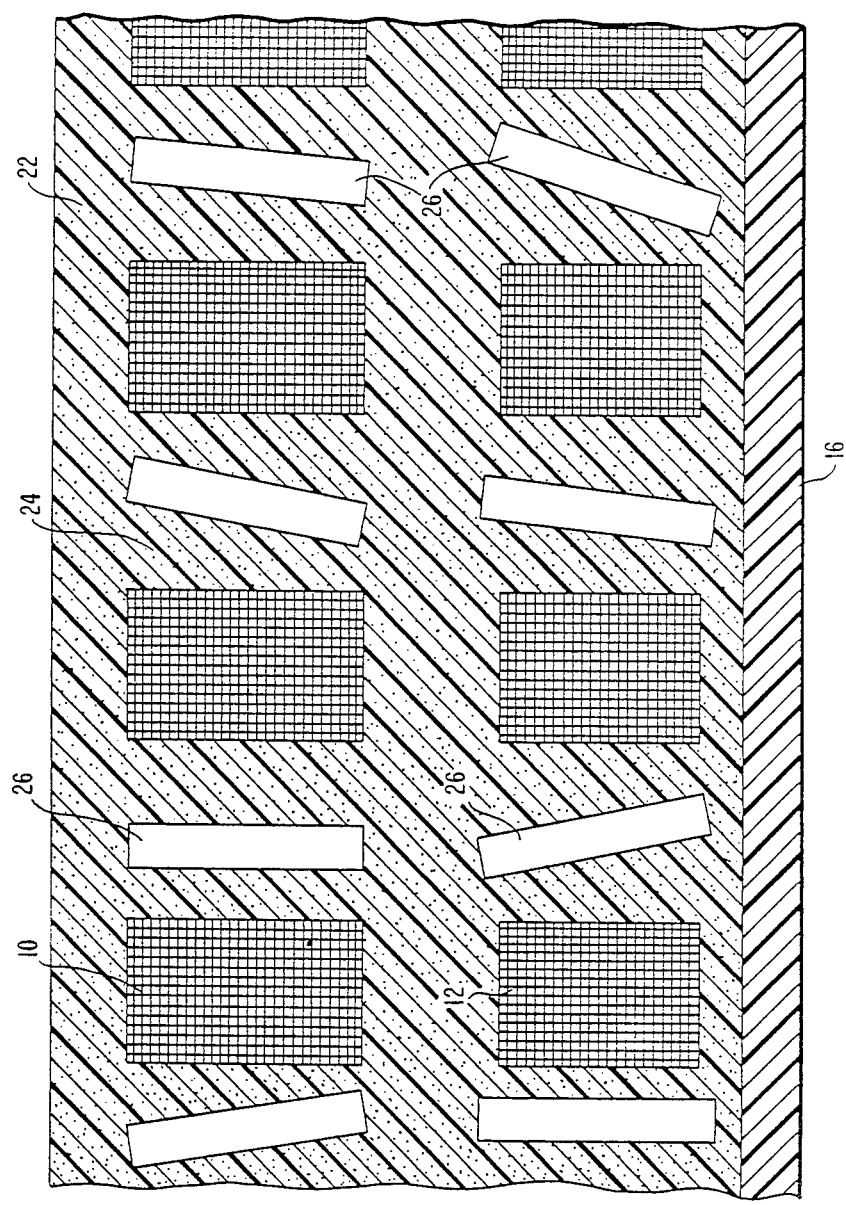
FIG. 3 is a partial cross-sectional view taken along the line 3—3 of FIG. 1.

A thixotropic resin filler 22 is disposed in the vent areas 24 between adjacent coil end portions 10 and 12. The filler 22 is supported by cone member 16 and is disposed between adjacent coil end portions 10 and 12 as can be seen viewing FIG. 3. Such material is often pumped into the area to be filled using known techniques.

The filler 22 may appropriately be an epoxy, a polyester or a polyurethane resin or the like, such materials being conventionally used as potting resins for applications involving electrical machinery. Preferably, however, the resin filler 22 should be a two component epoxy resin which is filled with a particulate material such as, for example, a silica powder so as to provide a thixotropic mixture which will remain in place after pumping and during curing.

After curing, the epoxy material should preferably have a compressive strength greater than 5 KSI at room temperature and greater than 2 KSI at 90° C. Such materials are well known.

As set forth above, a known problem encountered in the use of curable resins such as epoxy materials in large volume is that the curing reaction is generally exothermic and the heat capacity of heat transfer characteristics of the curing resin is such that excessive temperatures sufficient to decompose the cured resin may develop in the central regions of the mass.

To alleviate this problem, a plurality of spacers or spacer blocks 26 are emplaced within the resin filler 22 disposed in the vent areas 24 between coil end portions 10 and 12. These spacer blocks 26 preferably may be constructed of a glass mat reinforced polyester laminated sheet having the following physical characteristics: Tensile Str, 10,000 Psi, Min. Impact Str, 8 Ft Lbf/Inch-Notch, Min. Flexural Str, Psi, Min, 18,000; after 1 hr at 130 C (266 F), 9,000 Compressive Str, Psi, Min, less than 1 inch thk, 30,000; 1 inch thk & over, 34,000.

Generally speaking, in machines of the sort to which the present invention is directed, the length of the vent areas 24 from the outboard end of the diamond area to the stator slot is approximately 28 to 36 inches, and the vents have a nominal width of about 1 inch. The spacers blocks 26, when utilized in conjuntion with such vents, should have a thickness which is about ½ inch less than the width of the vent, and a width which is approximately the same as the depth of the coil end portions 10, 12. A useful spacer block 26 thus may have dimensions which are approximately ½ inch by 3 ½ inches by 5 inches. Thus, the spacer blocks 26 are elongated and as can best be seen in FIG. 2, the same are arranged in end-to-end relationship in each respective vent area 24 defined between adjacent end portions 10.

As is well known to those of ordinary skill in the dynamoelectric machine art, epoxy resins useful for filling the vents between the end coil windings generally have a coefficint of thermal expansion of about 90 to $100 \times 10^{-6}$ per degree Centigrade. The coil windings themselves are orthotropic and the coefficient of thermal expansion of such items cannot be determined with any great mathematical exactitude; however, it is generally understood that epoxy resin filler materials appear to have a coefficient of thermal expansion which is approximately 4 times the coefficient of thermal expansion of the coils in a direction which is through the thickness of the latter. The general result has been that upon encountering the temperature differences experienced in the coil end windings during operation, the different expansions and contractions of the coil end windings and the filler materials often causes the resin to debond from the coil windings, thus destroying the physical integrity of the support arrangement. Manifestly, evidence of debonding is evidence of inappropriate and inefficient end winding filler materials and debonding should be avoided to the extent possible. The present invention provides means which prevents or at least inhibits such debonding.

The preferred blocks 26 of the present invention are laminates which are orthotropic with regard to the coefficient of thermal expansion. Through their thicknesses, the spacer blocks may have a coefficient of thermal expansion which is approximately $40 \times 10^{-6}$ per degree Centigrade. Thus, when the spacer blocks 26 are in place the overall coefficient of thermal expansion of the filler material between adjacent coil end portion 10, 12 is decreased somewhat. Ideally, in accordance with the present invention, the spacer blocks 26 should be able to control the coefficient of thermal expansion of the overall filler material and the physical properties thereof such that the filler material reacts in the same manner as the coil windings during temperature changes and operational stresses such as those resulting from vibration.

The spacer blocks 26 also decrease the total volume of the epoxy resin filler 22 so that the development of excessive temperatures in the central portions of the curing epoxy resin system is avoided. This is simply due to the physical displacement of the curing resin and the lessening of the total volume of the same.

With all of the foregoing considerations in mind, it has been found that the spacer blocks 26 may occupy up to about 50% of the total volume of the vent areas 24 and preferably should occupy approximately 30% of such volume. Manifestly, the determination of the appropriate size of the spacer blocks 26 and the overall volume to be occupied by the same must be determined empirically so that excessive temperature build up in the curing resin mass is avoided and so that the filler system, after curing, reacts with the coil ends during generator operation to thus avoid debonding and development of cracks.

Viewing FIG. 4, it can be seen that each spacer block 26 is preferably configured in the form of a regular geometric shape presenting generally planar surfaces 28 on each side thereof. When spacer blocks 26 are in place, the surfaces 28 thereof are disposed in generally facing relationship relative to the adjacent coil end portions 10, 12. Preferably the spacer blocks 26 are orthogonal in shape as shown in FIG. 4. Resilient means in the form of a bead of an epoxy material 30 are provided at the edges of the surface 28. The beds 30 are disposed for preventing abrasive contact between the spacer blocks 26 and the adjacent coil end portions 10, 12 during the initial positioning of the spacer blocks 26 and during the operation of the generator. The bead is put in place and cured prior to the placement of the spacer blocks 26 during assembly of the filler material. The material from which the beads 30 are constructed may preferably be the same as or similar to the resin 22.

During assembly of the filler material, the epoxy components are mixed together and the mixture pumped into the vent areas 24 using known techniques. The epoxy filler 22, being thixotropic, will remain in place on the cone and in the vent areas 24 between adjacent coil end portions 10, 12 during this assembly. Preferably the epoxy filler 22 should be filled to a level of about one-half way up the width of the bottom coil end portions 12 and then the spacer blocks 26 are simply pushed into place manually. After the spacer blocks 26 are in place in the vent areas 24 between the bottom coil end portions 12, an additional amount of the still fluid, curing resin material is pumped from the top of the spacer blocks 26 until the epoxy filler fills between the top coil end portion 10 up to about half of the depth of the vent area 24. Then spacer blocks 26 are pushed into place manually in the vent areas 24 between the top coil end portion 10. Again after all the spacer blocks 26 between the top coils end portion 10 are in place, further quantities of the curing resin system are pumped so as to fill the vent areas 24 between the top coils end portion 10.

We claim:

1. A filler material for supporting a series of coil end portions forming a diamond area of a dynamoelectric machine, said end portions having coefficient of thermal expansion characteristics and being elongated and arranged in a generally parallel, laterally spaced relationship to present respective elongated vent areas between adjacent coil end portions, said filler material comprising:
    a resin filler having coefficient of thermal expansion characteristics which are not the same as the coefficient of thermal expansion characteristics of the coil end portions, said resin filler being disposed in said vent areas between adjacent coil end portions; and
    a plurality of elongated spacer blocks disposed within the resin filler in each of said vent areas, the spacer blocks in each vent area being arranged in spaced, end-to-end relationship and having sufficient volume and coefficient of thermal expansion characteristics to prevent excessive build up of temperature during the curing of the resin filler and decrease the overall coefficient of thermal expansion of the filler material whereby to adjust the coefficient of thermal expansion characteristics of the filler material so that the such characteristics more closely match the coefficient of thermal expansion characteristics of the coil end portions.

2. A filler material as set forth in claim 1 wherein said spacer blocks occupy up to about 50% of the volume of the filler material.

3. A filler material as set forth in claim 2 wherein said spacer blocks occupy approximately 30% of the volume of the filler material.

4. A filler material as set forth in claim 1 wherein said resin filler comprises an epoxy resin.

5. A filler material as set forth in claim 1 wherein said blocks are constructed of a laminated fiberglass material.

6. A filler material as set forth in claim 1 wherein each of said blocks are configured in the form of regular geometric shapes having generally planar surfaces disposed in facing relationship to the respectve adjacent coil end portions defining the vent areas where the blocks are disposed.

7. A filler material as set forth in claim 6 wherein resilient means are provided on said planar surfaces for preventing abrasive contact between the blocks and the adjacent coil end portions.

8. A filler material as set forth in claim 7 wherein said planar surfaces have edges and said resilient means comprises a bead of resin material at said edges of said planar surfaces.

9. A filler material as set forth in claim 6 wherein said blocks are generally orthogonal in shape.

10. A filler material as set forth in claim 9 wherein resilient means are provided on said planar surfaces for preventing abrasive contact between the blocks and the adjacent coil end portions.

11. A filler material as set forth in claim 10 wherein said planar surfaces have edges and said resilient means comprises a bead of resin material at said edges of said planar surfaces.

12. A dynamoelectric machine comprising a stator having a series of outwardly extending winding coil end portions forming a diamond area at each end thereof, and a filler material for supporting said coil end portions at each diamond area, the coil end portions at each diamond area having coefficient of thermal expansion characteristics and being elongated and arranged in a generally parallel, laterally spaced relationship to present respective elongated vent areas between adjacent coil end portions, said filler material comprising:
    an epoxy resin filler having coefficient of thermal expansion characteristics which are not the same as the coefficient of thermal expansion characteristics of the coil end portions, said resin filler being disposed in said vent areas between adjacent coil end portions; and
    a plurality of elongated, laminated, fiberglass spacer blocks disposed within the epoxy resin filler in each vent area, the blocks in each of said vent areas being arranged in spaced, end-to-end relationship and having sufficient volume and coefficient of thermal expansion characteristics to prevent excessive build up of temperature during curing of the epoxy resin filler and decrease the overall coefficient of thermal expansion of the filler material whereby to adjust the coefficient of thermal expansion characteristics the filler material so that such characteristics more closely match the coefficient of thermal expansion characteristics of the coil end portions.

13. A filler material as set forth in claim 12 wherein said spacer blocks occupy up to about 50% of the volume of the filler material.

14. A filler material as set forth in claim 13 wherein said blocks are configured in the form of regular geometric shapes having generally planar surfaces disposed in facing relationship to the adjacent coil end portions defining the vent areas where the blocks are disposed.

15. A filler material as set forth in claim 14 wherein resilient means are provided on said planar surfaces for preventing abrasive contact between the blocks and the adjacent coil portions.

16. A filler material as set forth in claim 15 wherein said planar surfaces have edges and said resilient means comprises a bead of resin material at the edge of said planar surfaces.

17. A filler material as set forth in claim 14 wherein said blocks are generally orthogonal in shape.

18. A filler material as set forth in claim 17 wherein said resilient means are provided on said planar surfaces for preventing abrasive contact between the blocks and the adjacent coil end portions.

19. A filler material as set forth in claim 18 wherein said planar surfaces have edges and said resilient means comprises a bead of resin material at the edges of said planar surfaces.

* * * * *